(12) United States Patent
Morii

(10) Patent No.: US 11,729,339 B2
(45) Date of Patent: Aug. 15, 2023

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Hiroyuki Morii, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/193,989

(22) Filed: Mar. 5, 2021

(65) Prior Publication Data

US 2021/0195062 A1    Jun. 24, 2021

Related U.S. Application Data

(63) Continuation of application No. 16/385,972, filed on Apr. 16, 2019, now Pat. No. 10,972,633, which is a continuation of application No. 14/702,908, filed on May 4, 2015, now Pat. No. 10,277,777.

(30) Foreign Application Priority Data

May 7, 2014    (JP) ................. 2014-095676

(51) Int. Cl.
*H04N 1/44*    (2006.01)
*G06K 15/00*    (2006.01)
*H04N 1/00*    (2006.01)

(52) U.S. Cl.
CPC ....... *H04N 1/4426* (2013.01); *G06K 15/4095* (2013.01); *H04N 1/00411* (2013.01); *H04N 1/00474* (2013.01); *H04N 1/4413* (2013.01); *H04N 1/00* (2013.01)

(58) Field of Classification Search
CPC ............. H04N 1/4426; H04N 1/00411; H04N 1/00474; H04N 1/4413; H04N 1/00413; H04N 1/00; G06K 15/4095
USPC ....................................... 358/1.14
See application file for complete search history.

(56) References Cited

U.S. PATENT DOCUMENTS

| | | | | |
|---|---|---|---|---|
| 2003/0072031 | A1* | 4/2003 | Kuwata ............. | H04N 1/00188 358/1.15 |
| 2007/0223031 | A1* | 9/2007 | Kitada ............... | G06Q 10/10 358/448 |
| 2010/0157363 | A1* | 6/2010 | Ishikawa ............ | G06F 3/1203 358/1.15 |
| 2010/0211885 | A1* | 8/2010 | Berg .................. | G06F 40/174 715/745 |
| 2012/0300252 | A1* | 11/2012 | Nagata ............... | G06F 21/6218 358/1.15 |

* cited by examiner

*Primary Examiner* — Darryl V Dottin
(74) *Attorney, Agent, or Firm* — Canon U.S.A., Inc., IP Division

(57) ABSTRACT

An image forming apparatus that dynamically and suitably switches login processing between a user who selects an icon and a user who is identified by reading of a card. The image forming apparatus searches user information of a user who logs in by selecting a user icon displayed on a display unit and a user who logs in using a card, and performs the login processing on a searched user.

23 Claims, 22 Drawing Sheets

FIG. 9

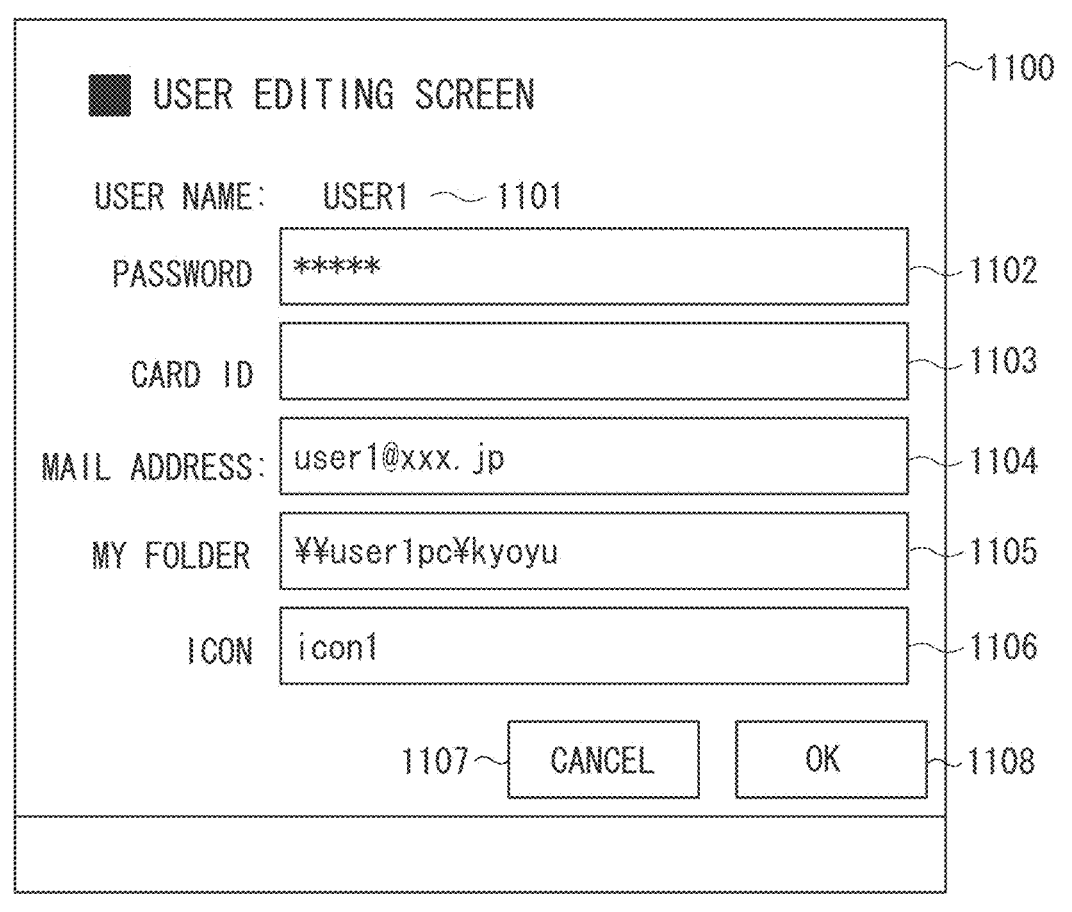

USER EDITING SCREEN — 1100

USER NAME: USER1 — 1101

PASSWORD: ***** — 1102

CARD ID: — 1103

MAIL ADDRESS: user1@xxx.jp — 1104

MY FOLDER: \\user1pc\kyoyu — 1105

ICON: icon1 — 1106

1107 — CANCEL    OK — 1108

FIG. 10

| | | |
|---|---|---|
| ■ USER REGISTRATION SCREEN | | ~1200 |
| USER NAME: | [ ] | ~1201 |
| PASSWORD | [ ] | ~1202 |
| CARD ID | [ ] | ~1203 |
| MAIL ADDRESS: | [ ] | ~1204 |
| MY FOLDER | [ ] | ~1205 |
| ICON | [ ] | ~1206 |
| 1207~ [CANCEL] | [OK] ~1208 | |

FIG. 13

| No | USER NAME | PASSWORD | CARD ID | MAIL ADDRESS | MY FOLDER | DEPARTMENT | ICON |
|----|-----------|----------|---------|--------------|-----------|------------|------|
| 1 | USER1 | XXXX | user1card | user1@XXX.jp | ¥¥user1pc¥kyoyu | FIRST SALES DEPARTMENT | icon1 |
| 2 | USER2 | XXXX | User2card | user2@XXX.jp | | PRODUCT PLANNING DEPARTMENT | icon2 |
| 3 | USER3 | XXXX | User3card | User3@XXX.jp | | LEGAL DEPARTMENT | icon3 |
| .. | | | | | | | |

1901  1902  1903  1904  1905  1906  1907

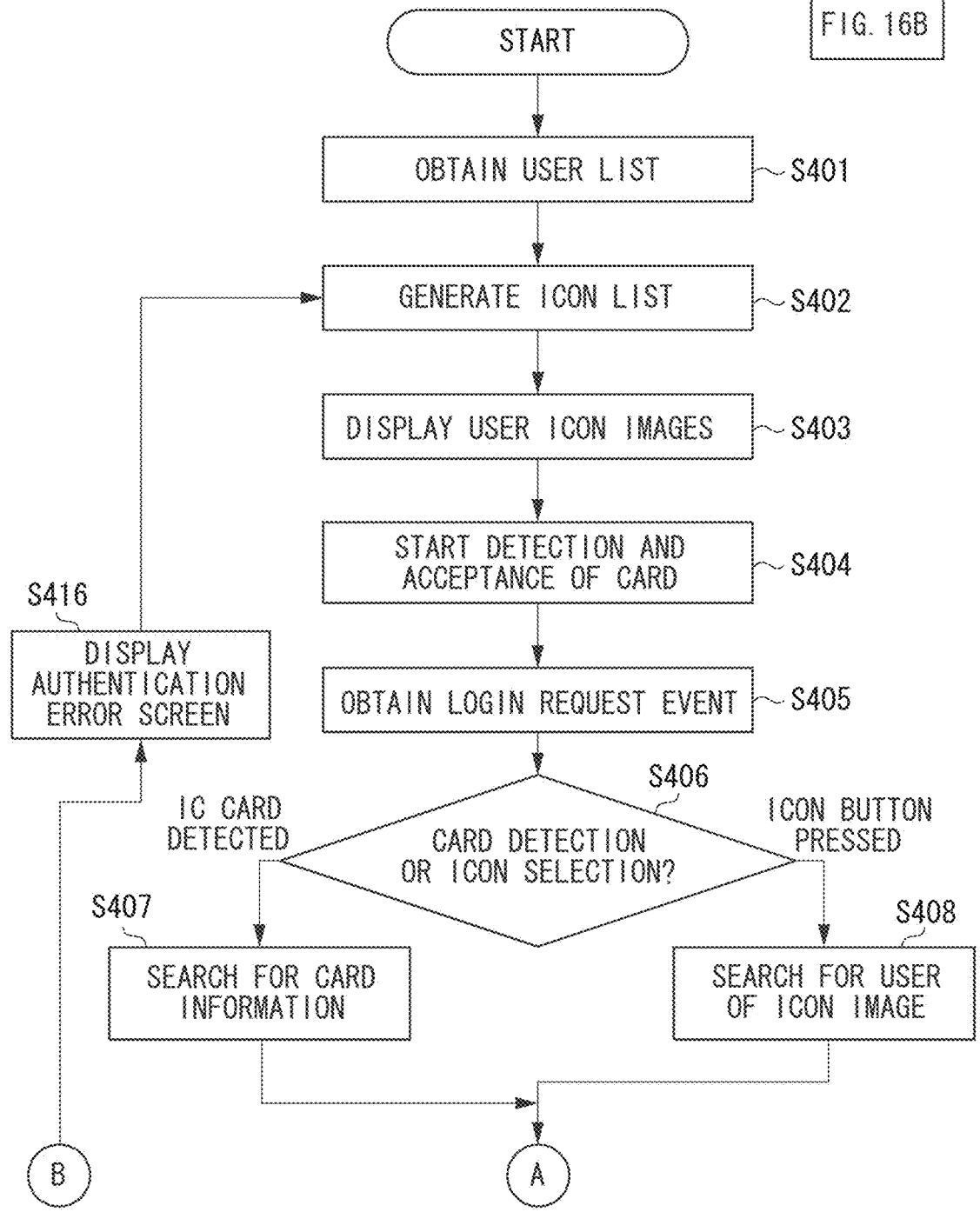

FIG. 19

| APPLICATION | SPECIFICATION ATTRIBUTE |
|---|---|
| COPY | NONE |
| SCAN AND TRANSMIT | MY FOLDER |

2001 — APPLICATION column
2002 — SPECIFICATION ATTRIBUTE column

FIG. 21

| INSTALLATION OFFICE ROOM 2101 | DEPARTMENT 2102 |
|---|---|
| COPY | FIRST SALES DEPARTMENT |

IMAGE FORMING APPARATUS, METHOD FOR CONTROLLING IMAGE FORMING APPARATUS, AND STORAGE MEDIUM

CROSS-REFERENCE TO RELATED APPLICATIONS

This is a continuation application of U.S. patent application Ser. No. 16/385,972 filed on Apr. 16, 2019, which is a continuation of U.S. patent application Ser. No. 14/702,908 filed on May 4, 2015 and issued on Apr. 30, 2019 as U.S. Pat. No. 10,277,777 which claims the benefit of Japanese Patent Application No. 2014-095676, filed May 7, 2014, all of which are hereby incorporated by reference herein in their entirety.

BACKGROUND OF THE INVENTION

Field of the Invention

The present invention relates to an image forming apparatus, a method for controlling the image forming apparatus, and a storage medium.

Description of the Related Art

A multi function peripheral (MFP) which includes an image reading device, a printing device, and a communication device, and has image processing applications for copying, printing, and transmission of a scanned image has been known. As security awareness has improved recently, many MFPs include a function for performing user authentication. There is an image forming apparatus that allows a user to use an MFP when the user inputs a username and a password as authentication information. However, in terms of operability, to manually input a username and password information from a touch panel on the MFP is troublesome for a user who wants to immediately use the MFP.

For reducing the trouble of such a user operation, there is an image forming apparatus that displays icon images linked with users on a screen of an MFP. The MFP becomes usable by a user simply selecting the user's own icon image displayed on the screen, as discussed, for example, in Japanese Patent Application Laid-Open No. 2012-254618.

There is also an image forming apparatus that can use cards distributed to employees as employee identification (ID) cards for authentication by an MFP. A user can perform an authentication operation by simply holding the user's card over a card reader connected to the image forming apparatus, and having the card reader read a card ID stored in the card as discussed, for example, in Japanese Patent Application Laid-Open No. 2009-187559.

According to the foregoing Japanese Patent Application Laid-Open No. 2012-254618, the number of displayed icon images increases as the number of users of the MFP increases. This lowers the searchability of the icon images and thus limits the number of users.

The MFP discussed in the foregoing Japanese Patent Application Laid-Open No. 2009-187559 can be used even in an environment with a large number of users. However, users who do not have a card (such as part-time workers, temporary staff, and short-term users) are not able to use the MFP. Users having no card need to input a username and a password as an alternative means for login. This causes operability troubles to some users.

As described above, there are constraints on the scale of users (the number of users) to use the MFP, and there are operability troubles to some users, so that they cannot enjoy the convenience.

SUMMARY OF THE INVENTION

The present invention is directed to an image forming apparatus capable of dynamically switching login processing suitably for both of a user who selects an icon and a user who is identified by reading of a card.

According to an aspect of the present invention, an image forming apparatus includes a management unit configured to manage user information associated with card identification information and an icon, a display unit configured to display a predetermined number of icons corresponding to the user information managed by the managing unit, a selection unit configured to select one of the icons displayed by the display unit, a reading unit configured to read card identification information from a card, and a login processing unit configured to, in either of cases where an icon is selected by the selection unit and where the card identification information is read by the reading unit, perform control to identify a corresponding user from the user information managed by the management unit and perform login processing on the identified user.

Further features of the present invention will become apparent from the following description of exemplary embodiments with reference to the attached drawings.

BRIEF DESCRIPTION OF THE DRAWINGS

FIG. 9 is a diagram illustrating a UI screen displayed on the operation unit.

FIG. 10 is a diagram illustrating a UI screen displayed on the operation unit.

FIG. 13 illustrates a user table managed by the image forming apparatus.

FIG. 19 illustrates a priority display attribute specification table managed by the image forming apparatus.

FIG. 21 illustrates an installation location management table managed by the image forming apparatus.

DESCRIPTION OF THE EMBODIMENTS

Exemplary embodiments of the present invention will be described in detail below with reference to the accompanying drawings. It should be noted that the following exemplary embodiments are not intended to limit the present invention set forth in the claims, and all combinations of features described in the exemplary embodiments are not necessarily indispensable to the solving means of the present invention.

<Description of System Configuration>
<<System Configuration>>

Figure 1:
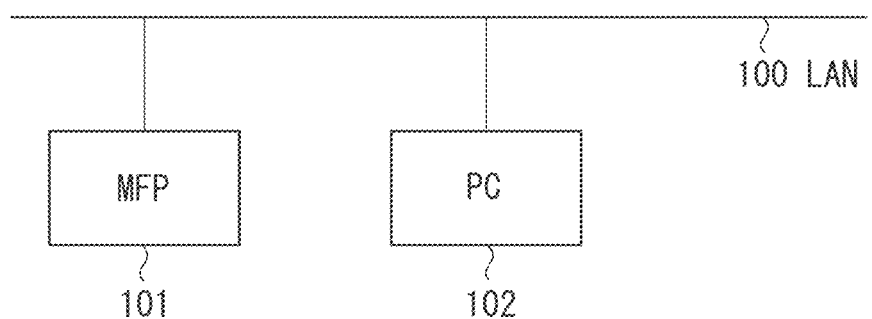
FIG. 1 is a diagram illustrating a configuration of a system to which an image forming apparatus is applied.

FIG. 1 is a diagram illustrating a configuration of a system to which an image forming apparatus according to the present exemplary embodiment is applied.

The system illustrated in FIG. 1 includes a personal computer (PC) 102 and an MFP 101 which are connected to a local area network (LAN) 100. The system is configured so that a user of the PC 102 can activate a browser and perform user registration and user editing by using a user interface (UI) screen provided by the MFP 101.

<Hardware Configuration>

Figure 2:
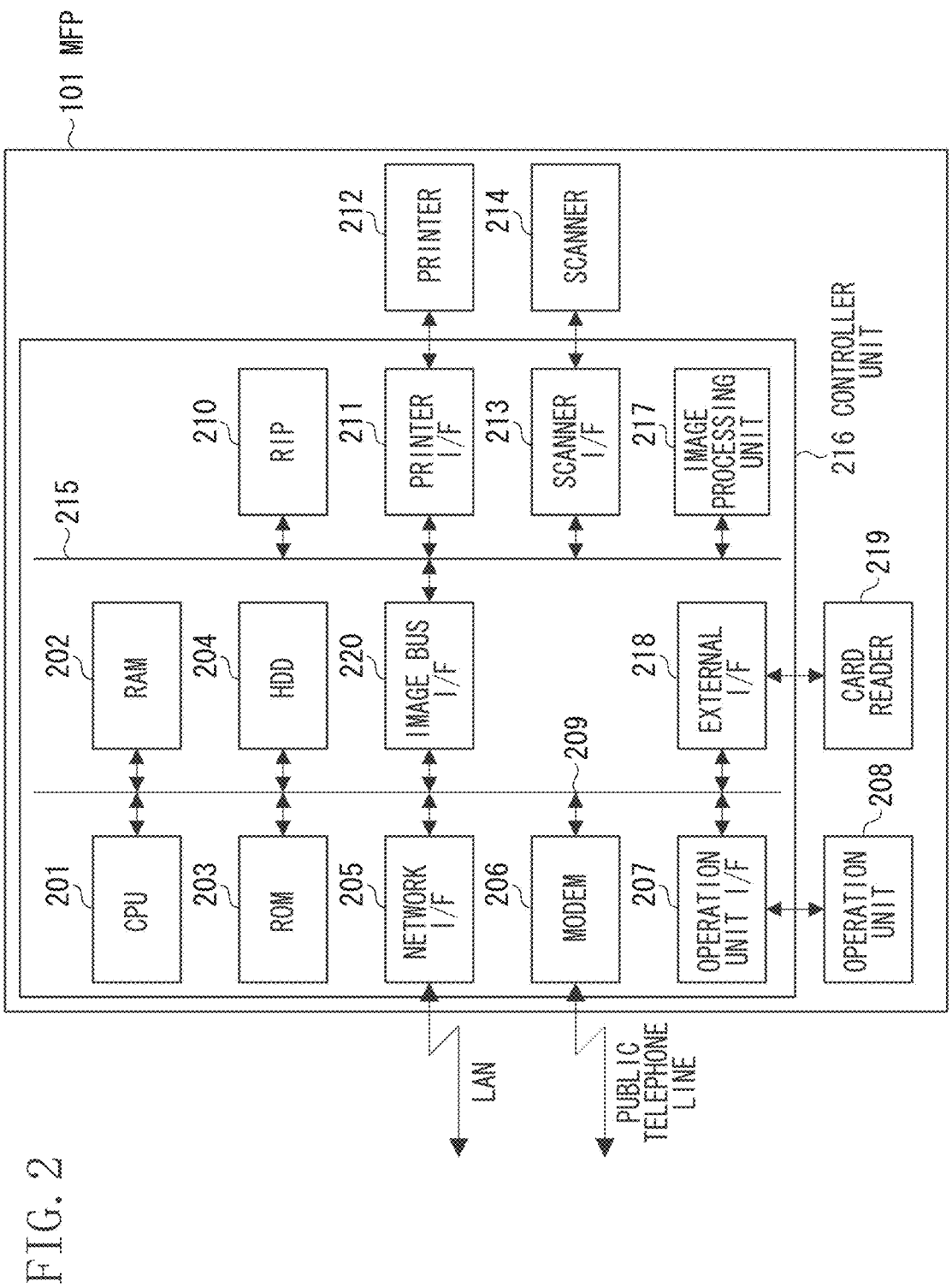
FIG. 2 is a block diagram illustrating a hardware configuration of the image forming apparatus.

FIG. 2 is a block diagram illustrating a hardware configuration of the image forming apparatus (i.e., MFP 101) illustrated in FIG. 1. A hardware configuration of the MFP 101 illustrated in FIG. 1 will be described below.

In FIG. 2, a controller unit 216 is connected to a scanner 214, which functions as an image input device and a printer 212, which functions as an image output device. The controller unit 216 is also connected to the LAN 100 and a public telephone line (wide area network (WAN)) (for example, the public switched telephone network (PSTN) or an Integrated Services for Digital Network (ISDN)) to input and output image data and device information.

The controller unit 216 includes a central processing unit (CPU) 201. The CPU 201 is a processor that controls the entire system. A random access memory (RAM) 202 is a system network memory for the CPU 201 to operate. The RAM 202 also serves as a program memory for recording a program and an image memory for temporarily recording image data.

A read-only memory (ROM) 203 stores a boot program of the system and various control programs. A hard disk drive (HDD) 204 stores various programs for controlling the system, and image data. An operation unit interface (operation unit I/F) 207 is an interface unit with an operation unit (UI) 208. The operation unit I/F 207 outputs image data to be displayed on the operation unit 208.

The operation unit I/F 207 also functions to transmit information (such as user information) input by the user of the system from the operation unit 208 to the CPU 201. The operation unit 208 includes a display unit including a touch panel. The user can press (touch with a finger or the like) buttons displayed on the display unit to issue various instructions.

A network interface (network I/F) 205 connects to the network (LAN) 100 and performs input and output of data. A modulator-demodulator (modem) 206 connects to the public telephone line and performs input and output of data such as facsimile (FAX) transmission and reception.

An external interface (external I/F) 218 accepts external inputs such as Universal Serial Bus (USB), the Institute of Electrical and Electronics Engineers (IEEE) 1394, a printer port, and Recommended Standard 232C (RS-232C). In the present exemplary embodiment, a card reader 219 for reading an integrated circuit (IC) card needed for authentication is connected to the external I/F 218. The CPU 201 can control reading of information from an IC card by the card reader 219 via the external I/F 218, and obtain card identification information read from the IC card. Such devices are arranged on a system bus 209.

An image bus interface (image bus I/F) 220 is a bus bridge which connects the system bus 209 with an image bus 215 for transferring image data at high speed and converts data structures. The image bus 215 includes a Peripheral Component Interconnect (PCI) bus or IEEE 1394. The following devices are arranged on the image bus 215.

A raster image processor (RIP) 210 rasterizes vector data such as page description language (PDL) code into a bitmap image. A printer interface (printer I/F) 211 connects the printer 212 with the controller unit 216, and performs synchronous/asynchronous conversion of image data. A scanner interface (scanner I/F) 213 connects the scanner 214 with the controller unit 216, and performs synchronous/asynchronous conversion of image data.

An image processing unit 217 performs correction, processing, and editing of input image data, and performs data correction processing and resolution conversion processing according to a color characteristic of the printer 212 on print output image data. The image processing unit 217 further performs rotation of image data and compression/decompression processing. Examples of the compression/decompression processing include Joint Photographic Experts Group (JPEG) compression/decompression processing for multivalued image data, and Joint Bi-level Image Experts Group (JBIG), Modified Modified READ (MMR), and modified Huffman (MH) compression/decompression processing for binary image data.

The scanner 214 illuminates an image on a sheet serving as an original document, and scans the image with a charge-coupled device (CCD) line sensor to convert the image into an electrical signal as raster image data. If original document sheets are set on a tray of an original document feeder and the user of the image forming apparatus (i.e., MFP 101) gives a read start instruction from the operation unit 208, the CPU 201 gives an instruction to the scanner 214 so that the original document feeder feeds the original document sheets one by one to perform an operation for reading an original document image.

The printer 212 is a unit that converts raster image data into an image on a sheet. The printer 212 may use methods such as an electrophotographic method and an inkjet method. The electrophotographic method uses a photosensitive drum or photosensitive belt. The inkjet method includes discharging ink from a small nozzle array to directly print an image on a sheet. The printer 212 starts a print operation according to an instruction from the CPU 201. The printer 212 includes a plurality of sheet feed stages and corresponding sheet cassettes so that different sheet sizes or different sheet orientations can be selected.

The operation unit 208 includes a liquid crystal display (LCD) display unit. A touch panel sheet is attached onto the LCD display unit. The operation unit 208 displays an operation screen of the system, and if a displayed key is pressed, notifies the CPU 201 of the position information of the pressed key via the operation unit I/F 207. The operation unit 208 also includes various operation keys such as a start key, a stop key, an ID key, and a reset key.

The start key of the operation unit 208 is used when starting the operation for reading an original document image. Two color light-emitting diodes (LEDs) of green and red are arranged in the center of the start key. The LEDs indicate by their colors whether the start key is in a usable state. The stop key of the operation unit 208 functions to stop a running operation. The ID key of the operation unit 208 is used when inputting a user ID of the user. The reset key is used when initializing settings made from the operation unit 208.

The card reader 219 reads information stored in an IC card according to control from the CPU 201, and notifies the CPU 201 of the read information via the external I/F 218. Examples of the IC card include Felica (registered trademark) (International Organization for Standardization (ISO)/International Electrotechnical Commission (IEC) 15408-compatible) manufactured by Sony Corporation and MIFARE (registered trademark) (ISO/IEC 14443-compatible) manufactured by NXP Semiconductors.

With such a configuration, the MFP 101 can transmit image data read from the scanner 214 to the LAN 100, and print and output print data received from the LAN 100 by using the printer 212.

Image data read from the scanner 214 can also be transmitted to the public telephone line by FAX via the modem 206. Image data received through the public telephone line by FAX can be output by using the printer 212.

<<Software Configuration>>×

Figure 3:
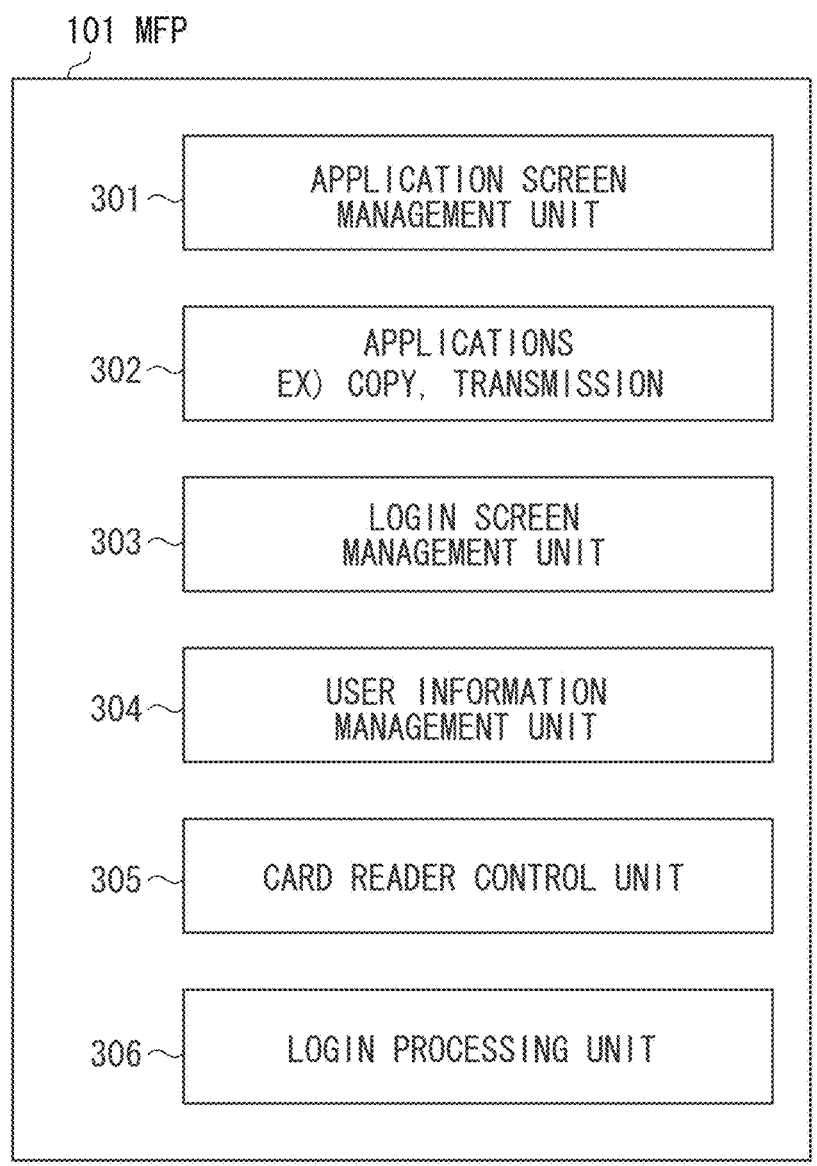
FIG. 3 is a block diagram illustrating a software configuration of the image forming apparatus.

FIG. 3 is a block diagram illustrating a software configuration of the image forming apparatus according to the present exemplary embodiment. The software configuration of the MFP 101 according to the present exemplary embodiment will be described below with reference to FIG. 3. Software functions of the MFP 101 are overviewed here, and the processing of each function will be described in detail thereafter.

Software of each unit illustrated in FIG. 3 is stored in the ROM 203 or the HDD 204 of the MFP 101, and executed by the CPU 201 of the MFP 101.

Figure 4:
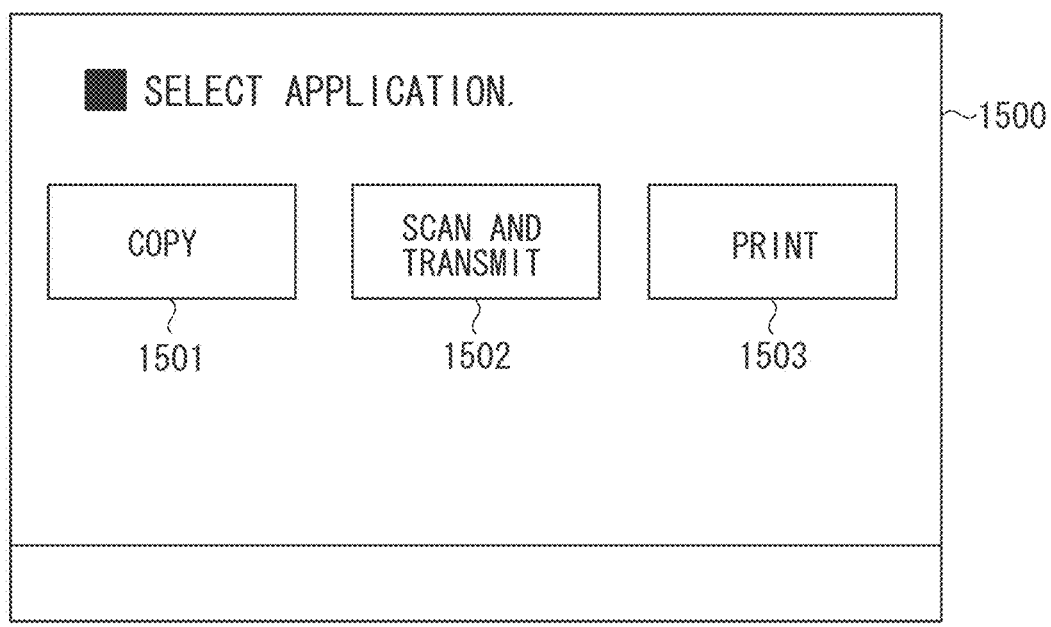
FIG. 4 is a diagram illustrating a user interface (UI) screen displayed on an operation unit.

In FIG. 3, an application screen management unit 301 displays an application selection menu screen 1500 illustrated in FIG. 4 on the operation unit 208.

Figure 5:
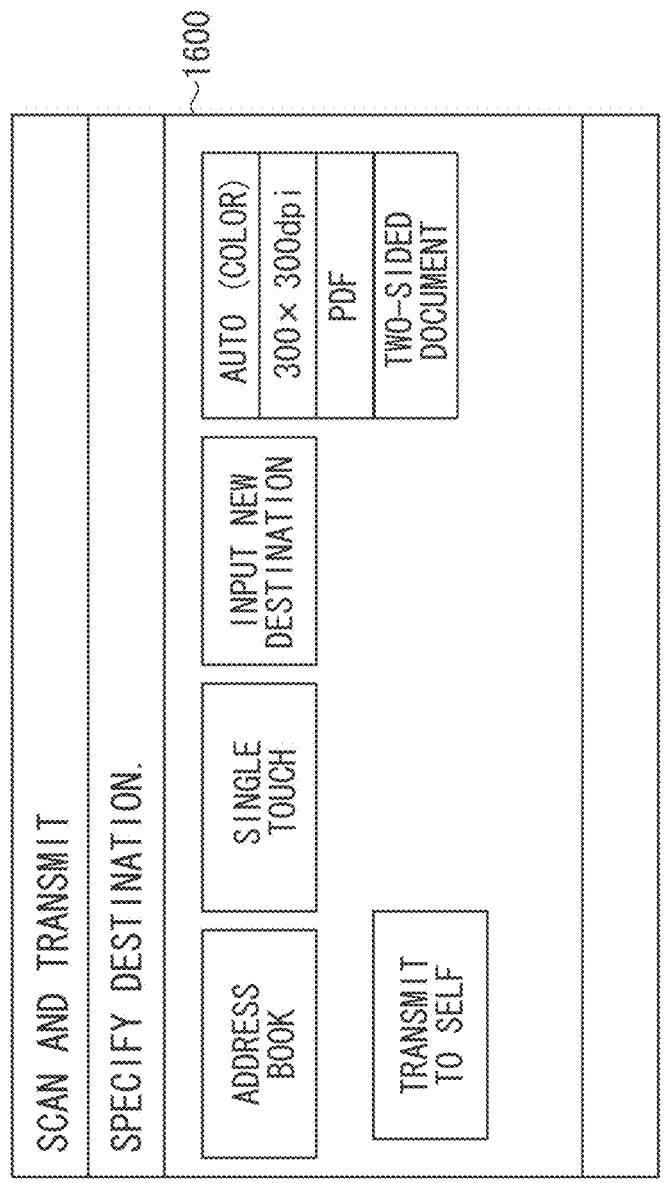
FIG. 5 is a diagram illustrating a UI screen displayed on the operation unit.

FIGS. 4 and 5 are diagrams illustrating examples of a UI screen displayed on the operation unit 208 illustrated in FIG. 2. FIG. 4 corresponds to the application selection menu screen 1500.

In FIG. 3, the application screen management unit 301 displays applications provided by the MFP 101 as buttons 1501, 1502, and 1503 on the application selection menu screen 1500. If a button 1501, 1502, or 1503 on the application selection menu screen 1500 is selected, the application screen management unit 301 displays a screen of the selected application.

Applications 302 provide various functions for the user. In the present exemplary embodiment, a copy application, a transmission application, and a print application will be described as examples of the applications 302. The copy application performs a copy function. The transmission application is an application that transmits image data scanned by the scanner 214 to a remote system using a mail application. If the scan and transmit button 1502 is selected, the transmission application can transmit image data scanned by the scanner 214 to the PC 102 by using a protocol such as Server Message Block (SMB) and the File Transfer Protocol (FTP).

The print application is an application that is intended to, if the button 1503 for performing a print function is selected, manage data of print jobs stored in the HDD 204 for each user and print the print job(s) of the login user.

The applications 302 display an operation screen of the selected application on the operation unit 208 to accept the user's operations. FIG. 5 illustrates an operation screen 1600 for the scan and transmission function.

Figure 6:
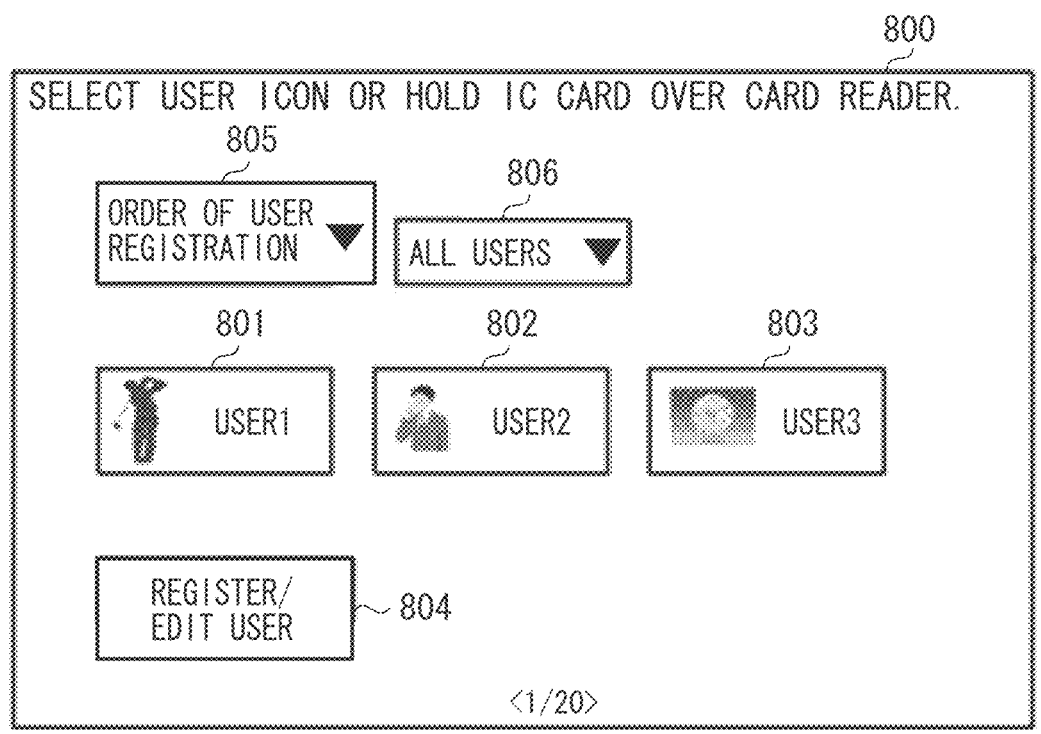
FIG. 6 is a diagram illustrating a UI screen displayed on the operation unit.
Figure 7:
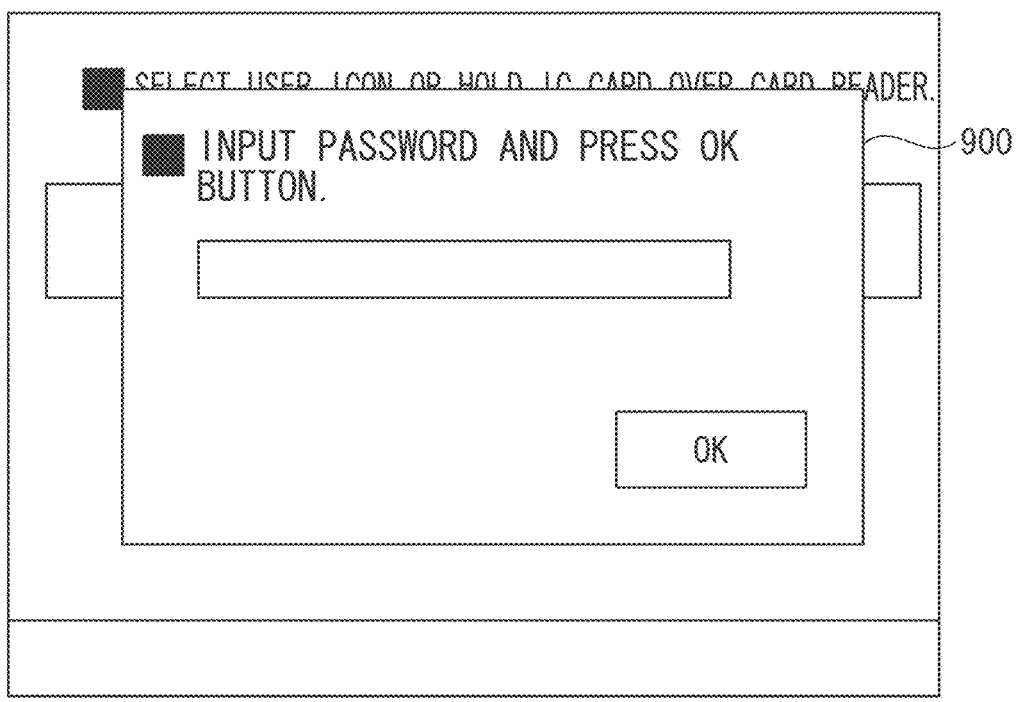
FIG. 7 is a diagram illustrating a UI screen displayed on the operation unit.

A login screen management unit 303 provides user authentication screens as illustrated in FIGS. 6 and 7 on the operation unit 208. The login screen management unit 303 also provides user information management screens for performing user registration or user edition as illustrated in FIGS. 8 to 12.

If the login screen management unit 303 is set to permit the user to use the MFP 101 only after login, the login screen management unit 303 displays a user authentication screen 800 as illustrated in FIG. 6 on the operation unit 208 as an initial state.

The login screen management unit 303 may be set to allow the user to use the function after login when an application that needs user authentication is selected. In such a case, the login screen management unit 303 can display the user authentication screen 800 when using such an application. The login screen management unit 303 may be set to allow the user to use a function of an application after login when selecting the application. In such a case, the login screen management unit 303 can display the application selection menu screen 1500 illustrated in FIG. 4 on the operation unit 208 as an initial state.

Features of the present exemplary embodiment will be described below with reference to UI screens illustrated in FIGS. 6 to 12 displayed on the operation unit 208.

FIGS. 6 to 12 are diagrams illustrating the UI screens displayed on the operation unit 208 illustrated in FIG. 2. The screen illustrated in FIG. 6 corresponds to an example of the user authentication screen 800 intended for user authentication using icon selection and a card.

The login screen management unit 303 displays buttons 801, 802, and 803, and a register/edit user button 804 on the user authentication screen 800. The buttons 801, 802, and 803 correspond to icon images linked with users who satisfy a display condition among users registered in a user table illustrated in FIG. 13. The information about attributes corresponding to functions to be executed by the users is also registered in the user table illustrated in FIG. 13.

The greater the number of users of the MFP 101, the greater the number of icon images to be displayed and the lower the searchability of the icon images. In the present exemplary embodiment, the number of icon images displayed on the user authentication screen 800 is thus limited to be smaller than the number of users registered in the user table.

More specifically, while the number of users that can be registered in the user table is 5000, the number of icon images displayable on the user authentication screen 800 is limited to 200. Although only three users are displayed on one screen in the example of FIG. 6, flick operations can scroll the screen to display up to 200 users.

Further, in the present exemplary embodiment, display order can be changed via the UI screen of FIG. 6 to change the displayed icon images of the users.

For example, if "order of user registration" is selected by a sort button 805, the icon images of up to 200 users can be displayed in a chronological order of the registration date and time of the user information.

If "order of use" is selected by the sort button 805, the icon images of up to 200 users among those who can use the MFP 101 can be displayed in a reverse chronological order of login date and time.

Furthermore, in the present exemplary embodiment, a filtering function can be used via the UI screen of FIG. 6 to filter the icon images of users to be displayed.

For example, if a sort button 806 is switched from "all users" to "users having print job(s)," only the icon images of users corresponding to the print jobs managed by the print application are displayed as the icon images of the users to be displayed.

In such a manner, according to the present exemplary embodiment, the sort function and the filtering function can be used to appropriately change the icon images of the users to be displayed.

If the button 801, 802, or 803 corresponding to a user icon image (icon image) is selected, the login screen management unit 303 obtains the user information linked with the icon image from the user table (FIG. 13), and requests a user authentication to a login processing unit 306. If the register/edit user button 804 is selected, the login screen management unit 303 displays a user registration and editing screen 1000 illustrated in FIG. 8 on the operation unit 208.

After the display of the user authentication screen 800, the login screen management unit 303 requests a card reader control unit 305 to start detection and acceptance of a card. This enables login by using an IC card (card) carried by the user.

FIG. 7 illustrates an example of a UI screen corresponding to a password input screen 900 at a time of registering a password. If password information about the user of the icon image selected on the user authentication screen 800 is registered in the HDD 204, the login screen management unit 303 displays the password input screen 900 to request an input of a password. The login screen management unit 303 requests the login processing unit 306 to perform collation to check whether a password input by the user from the operation unit 208 coincides with a password obtained from the user table (FIG. 13).

Figure 8:
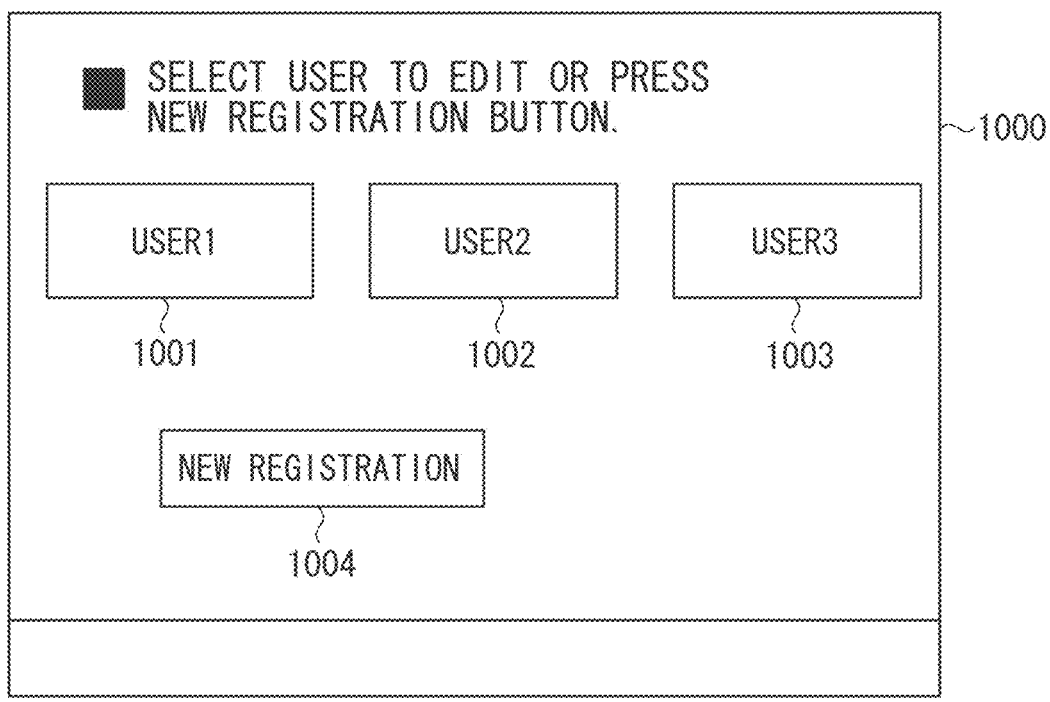
FIG. 8 is a diagram illustrating a UI screen displayed on the operation unit.

FIG. 8 is an example of a UI screen corresponding to the user registration and editing screen 1000.

The login screen management unit 303 displays buttons 1001 to 1003 corresponding to the icon images and a new registration button 1004 for registering a new user on the user registration and editing screen 1000.

If any one of the buttons 1001 to 1003 corresponding to the icon images is selected by the user's operation, the login screen management unit 303 displays a user attribute information editing screen 1100 illustrated in FIG. 9, intended to edit the user information linked with the icon image, on the operation unit 208. If the new registration button 1004 is selected, the login screen management unit 303 displays a new user registration screen 1200 illustrated in FIG. 10, intended to register a new user, on the operation unit 208.

FIG. 9 illustrates an example of a UI screen corresponding to the user attribute information editing screen 1100.

The login screen management unit 303 obtains the user information linked with the button 1001, 1002, or 1003 corresponding to the icon image selected on the user registration and editing screen 1000 from a user information management unit 304. The login screen management unit 303 then displays the obtained user information on the user attribute information editing screen 1100 on the operation unit 208. A username 1101 displays information about a username 1901 in the user table (FIG. 13).

A password 1102 displays information about a password 1902 in the user table (FIG. 13). If the user requests a change of the password 1102, the login screen management unit 303 accepts a password change request. A card ID 1103 displays information about a card ID 1903 in the user table (FIG. 13). If the user selects the card ID 1103, the login screen management unit 303 displays a card registration screen 1400 illustrated in FIG. 12 to accept a card registration request.

Information about a mail address 1904 in the user table (FIG. 13) is registered in a mail address 1104. As employed herein, the mail address corresponds to an attribute for identifying a function for the user to execute. If the user requests a change of the mail address 1104, the login screen management unit 303 accepts a mail address change request.

Information about a "my folder" 1905 in the user table (FIG. 13) is registered in a "my folder" 1105. If the user requests a change of the "my folder" 1905, the login screen management unit 303 accepts a "my folder" change request. An attribute for identifying an area where the registered user works is registered in a department 1906. An icon 1907 in the user table (FIG. 13) is registered in an icon 1106. If the user selects the icon 1106, the login screen management unit 303 displays a use icon image change screen 1300 illustrated in FIG. 11 to accept an icon change request.

If a cancel button 1107 is selected, the login screen management unit 303 displays the user registration and editing screen 1000 illustrated in FIG. 8. If an OK button 1108 is selected, the login screen management unit 303 requests the user information management unit 304 to update the user table (FIG. 13) with the accepted change information, and displays the user registration and editing screen 1000.

FIG. 10 is an example of a UI screen corresponding to the new user registration screen 1200.

The login screen management unit 303 displays the new user registration screen 1200 including attribute information 1201 to 1206 about a user. If a card ID 1203 is selected, the login screen management unit 303 displays the card registration screen 1400 illustrated in FIG. 12 to accept a registration request. If an icon 1206 is selected, the login screen management unit 303 displays the use icon image change screen 1300 illustrated in FIG. 11 to accept a registration request. The login screen management unit 303 also accepts a registration request about other attributes 1201, 1202, 1204, and 1205 in a manner similar to on the user attribute information editing screen 1100.

If a cancel button 1207 is selected on the UI screen illustrated in FIG. 10, the login screen management unit 303 displays the user registration and editing screen 1000 illustrated in FIG. 8. If an OK button 1208 is selected, the login screen management unit 303 requests the user information management unit 304 to update the user table (FIG. 13) with the accepted registration information, and displays the user registration and editing screen 1000.

Figure 11:
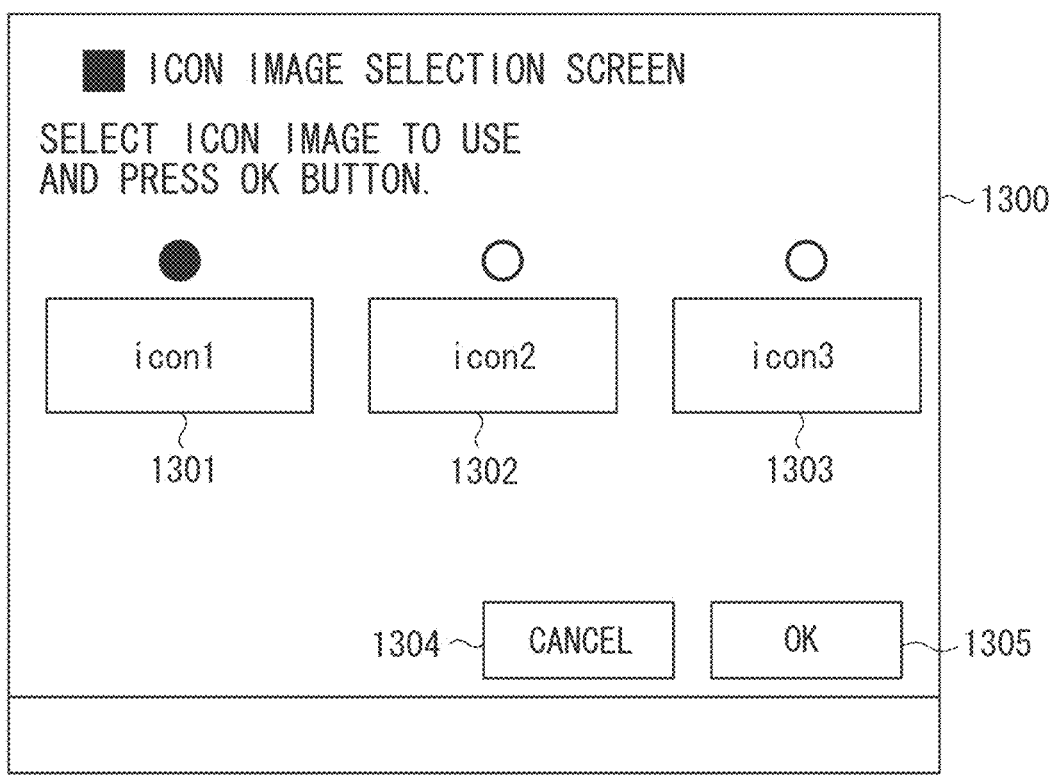
FIG. 11 is a diagram illustrating a UI screen displayed on the operation unit.

FIG. 11 illustrates an example of a UI screen corresponding to the use icon image change screen 1300.

The login screen management unit 303 displays a list of icon images (buttons 1301 to 1303) registered in advance and information indicating the currently-selected icon image (• in the diagram) on the use icon image change screen 1300.

If an OK button 1305 is selected on the UI screen illustrated in FIG. 11, the login screen management unit 303 accepts an icon image change request from the user. The login screen management unit 303 then displays the user attribute information editing screen 1100 or the new user registration screen 1200.

If a cancel button 1304 is selected on the UI screen illustrated in FIG. 11, the login screen management unit 303 displays the user attribute information editing screen 1100 or the new user registration screen 1200 without accepting a change request.

Figure 12:
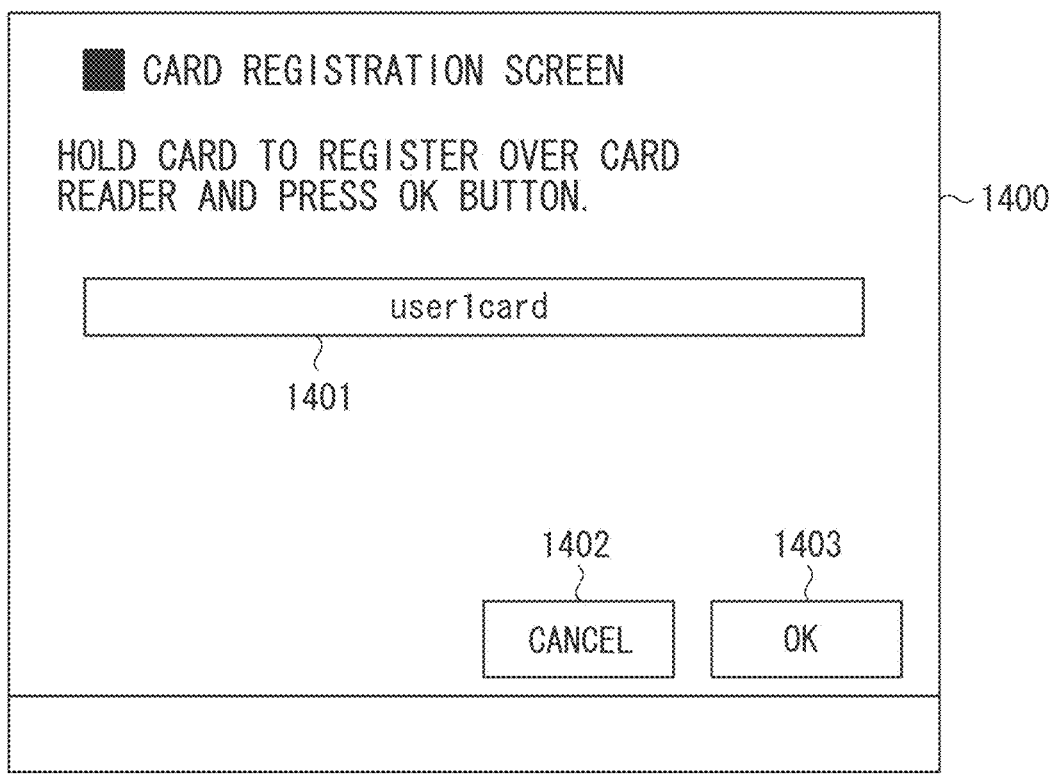
FIG. 12 is a diagram illustrating a UI screen displayed on the operation unit.

FIG. 12 illustrates an example of a UI screen corresponding to the card registration screen 1400.

The login screen management unit 303 displays the card registration screen 1400 and requests the card reader control unit 305 to start detection and acceptance of a card. If the user holds an IC card over the card reader 219, the login screen management unit 303 obtains detected card information from the card reader control unit 305 and displays the obtained card information 1401.

If a cancel button 1402 is selected on the UI screen illustrated in FIG. 12, the login screen management unit 303 displays the user attribute information editing screen 1100 or the new user registration screen 1200 without accepting a card registration request. If an OK button 1403 is selected, the login screen management unit 303 accepts a registration request for the obtained card information 1401, and displays the user attribute information editing screen 1100 or the new user registration screen 1200.

Figure 14:
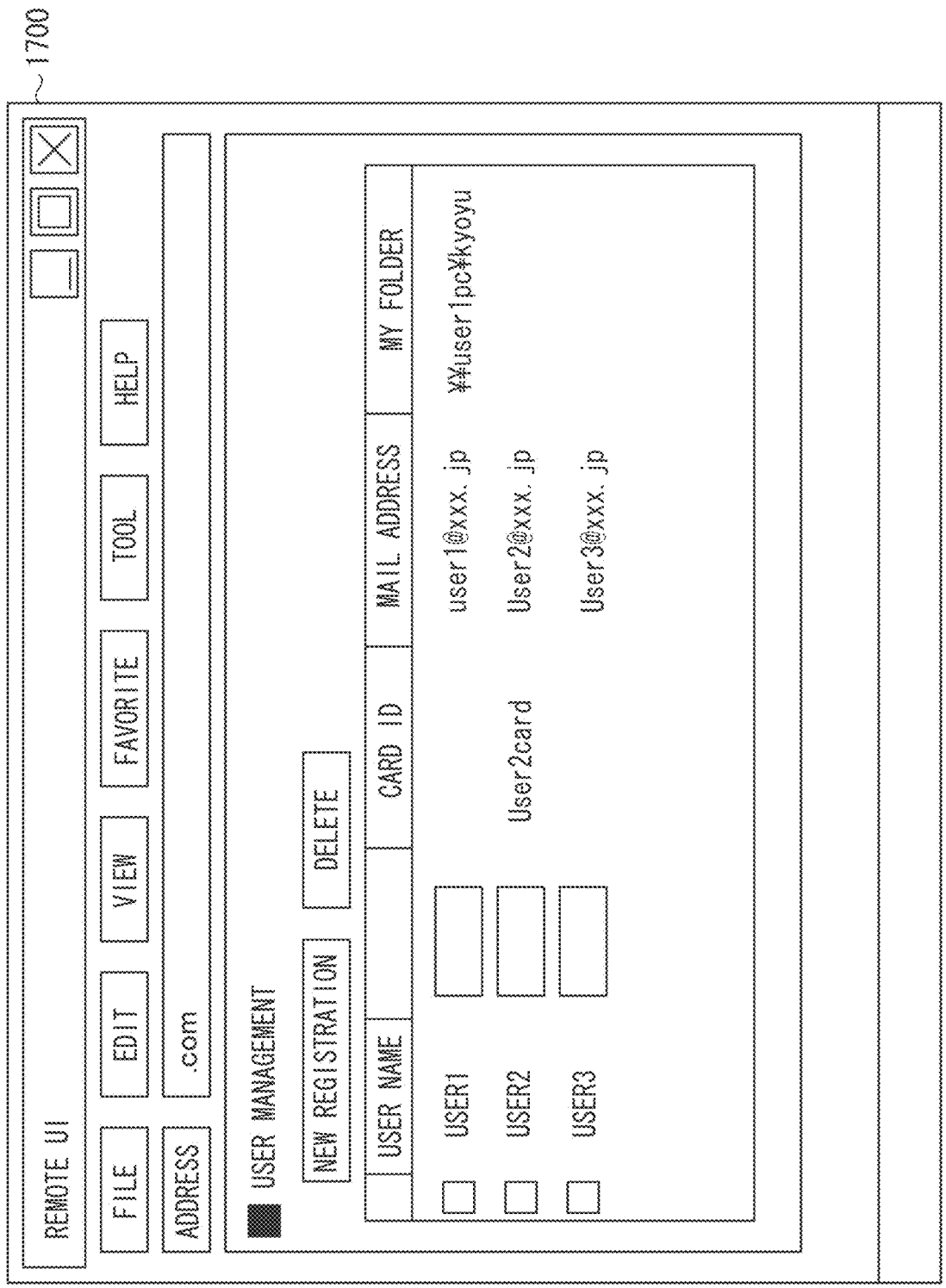
FIG. 14 is a diagram illustrating a UI screen displayed on the operation unit.
Figure 15:
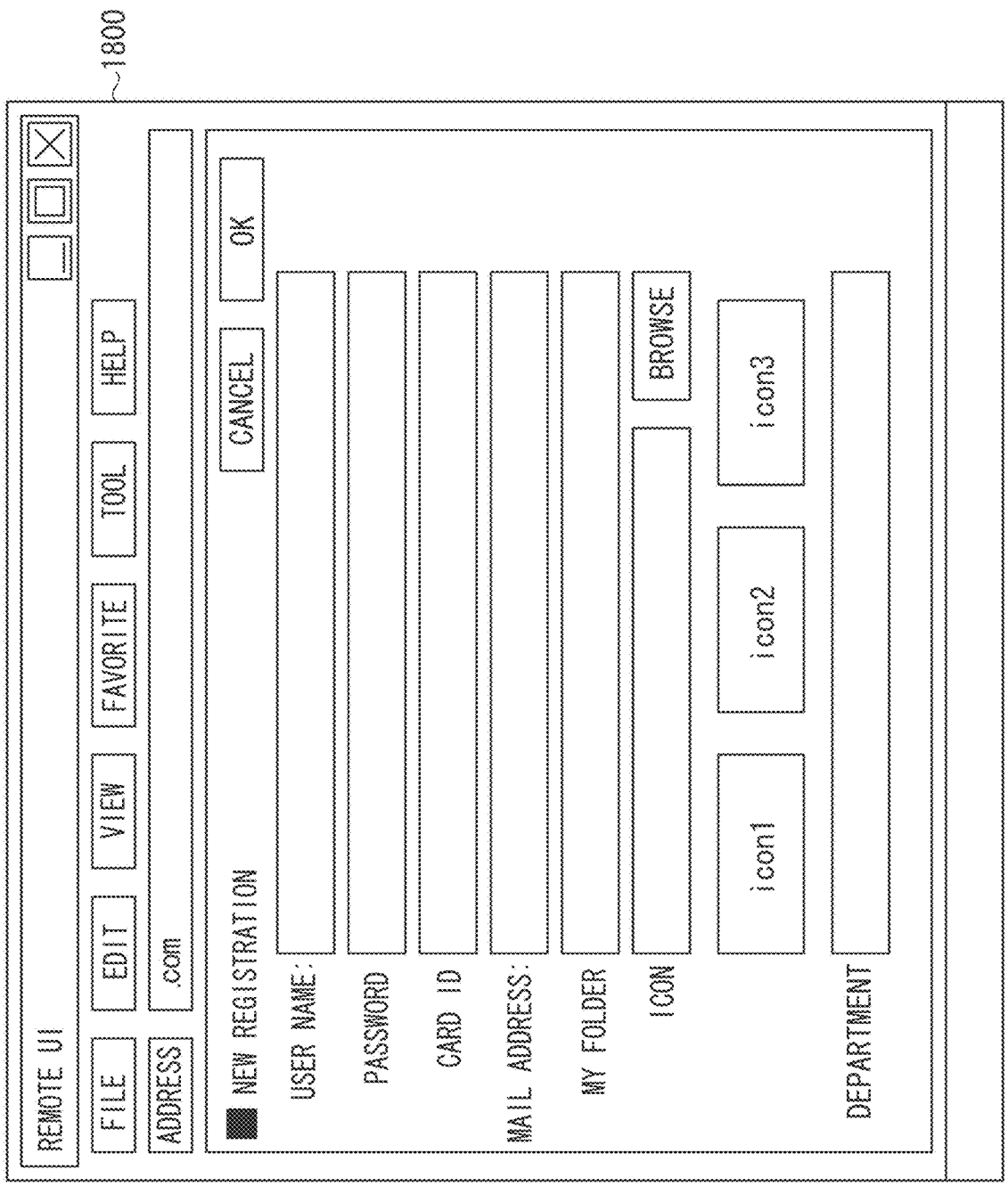
FIG. 15 is a diagram illustrating a UI screen displayed on the operation unit.

FIGS. 14 and 15 are diagrams illustrating examples of UI screens displayed on the operation unit 208 illustrated in FIG. 2. The UI screen illustrated in FIG. 14 corresponds to an example of a user registration and editing screen 1700 via the browser. The UI screen illustrated in FIG. 15 corresponds to an example of a new user information registration screen 1800 via the browser.

The login screen management unit 303 can also display the user registration and editing screen 1700 illustrated in FIG. 14 and the new user information registration screen 1800 illustrated in FIG. 15 via a web browser on the PC 102 connected by the LAN 100 of the MFP 101.

The user registration and editing screen 1700 and the new user information registration screen 1800 enable the user to edit user information and execute a new user registration function on the user registration and editing screen 1000 via the web browser. Users can be deleted on the user registration and editing screen 1700. A new icon image can be imported and information about a department which the user belongs to can be registered on the new user information registration screen 1800. The contents of the user registration and editing via the web browser are similar to those on the user registration and editing screen 1000.

The user information management unit 304 stores information about users who use the MFP 101 in the HDD 304 in the form of the user table as illustrated in FIG. 13. The user information management unit 304 updates and manages the user table (FIG. 13) according to user registration/edit requests from the login screen management unit 303. The user information management unit 304 sends back information about the user table (FIG. 13) according to a user list acquisition request from the login screen management unit 303. If a user search or card search request is given from the login screen management unit 303, the user information management unit 304 transmits user information linked with information according to the request based on the user table (FIG. 13).

The card reader control unit 305 controls the card reader 219 connected to the MFP 101 and performs polling for card detection. If a user holds a card over the card reader 219, the card reader control unit 305 transmits the detected card information to the login processing unit 306 and issues a login request. If a card is detected and displayed on the card registration screen 1400, the card reader control unit 305 determines it to be a card registration request, and transmits the detected card information to the login screen control unit 303.

The login processing unit 306 accepts an icon image selection login request from the login screen management unit 303 and performs icon selection login processing on the MFP 101. The login processing unit 306 accepts a card login request from the card reader control unit 305 and performs card login processing.

The login processing unit 306 can automatically determine which request is accepted, the icon image selection login request or the card login request, and perform the login processing according to the accepted request.

More specifically, if the login processing unit 306 accepts an icon selection event from the login screen management unit 303, the login processing unit 306 performs the icon selection login processing. If the login processing unit 306 accepts a card detection event from the card reader 219, the login processing unit 306 performs the card login processing. Username information linked with the selected icon image can be obtained from the icon selection event. The card detection event includes identification information of the detected card.

The login processing unit 306 issues, to the user information management unit 304, a search request to search the user table (FIG. 13) based on the obtained information, and obtains user information linked with the information.

Figure 16B:
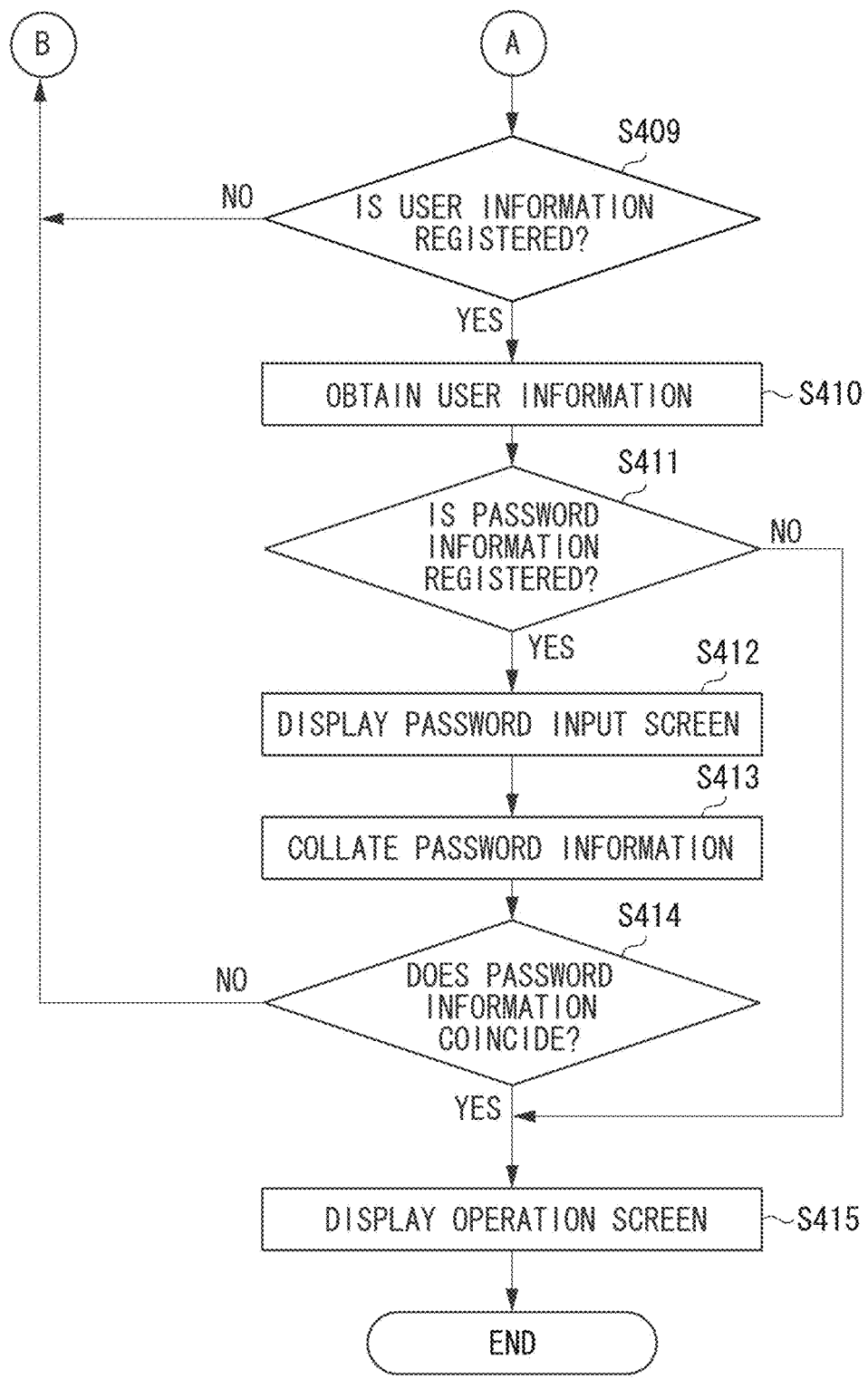
FIG. 16 (16A and 16B) is a flowchart illustrating a method for controlling the image forming apparatus.

FIG. 16 (16A and 16B) is a flowchart illustrating a method for controlling the image forming apparatus according to the present exemplary embodiment. This example corresponds to user authentication processing in the image forming apparatus. A program for performing the steps according to the present exemplary embodiment is stored as software in the ROM 203 or the HDD 204 of the MFP 101. The steps are executed by the CPU 201 of the MFP 101. In the following description, the modules illustrated in FIG. 3 are described to be entities.

In step S401, the login screen management unit 303 obtains a user list from the user information management unit 304 which manages the user table (FIG. 13). In step S402, the login screen management unit 303 checks a display condition (display order and the presence or absence of a filter) selected on the UI screen of FIG. 6. The login screen management unit 303 then obtains icons 1907 registered as being linked with users satisfying the display condition from the user list obtained in step S401. The login screen management unit 303 generates an icon list to display on the operation unit 208.

In step S403, the login screen management unit 303 generates a UI screen such as that of FIG. 6 and displays a predetermined number of user icon images on the operation unit 208 based on the icon list generated in step S402 so that a user can log in by using either method, icon selection or an IC card detection.

In step S404, the login screen management unit 303 requests the card reader control unit 305 to start detection and acceptance of a card by using the card reader 219. The card reader control unit 305 accepts the request to start detection and acceptance of a card, and puts the card reader 219 into a card detectable state.

In step S405, the login processing unit 306 obtains a login request event caused by the user's operation.

In step S406, the login processing unit 306 determines whether the login request event obtained in step S405 is a login request event caused by card detection or a login request event caused by icon selection. If the login processing unit 306 determines that the login request event is the one caused by card detection (IC CARD DETECTED in step S406), the processing proceeds to step S407. If the login processing unit 306 determines that the login request event is the one caused by icon selection (ICON BUTTON PRESSED in step S406), the processing proceeds to step S408.

If, in step S406, the login request event is determined to be the one caused by card detection (IC CARD DETECTED in step S406), then in step S407, the login processing unit 306 requests the user information management unit 304 to search for card information.

If, in step S406, the login request event is determined to be the one caused by icon selection (ICON BUTTON SELECTED in step S406), then in step S408, the login processing unit 306 requests the user information management unit 304 to search for the user of the selected icon image.

In step S409, the user information management unit 304 determines whether user information is registered according to the search request in step S407 or S408. If the accepted search request is the one made by using the card, the user information management unit 304 searches a card attribute 1903 in the user table (FIG. 13).

If the search request is the one made by using the selected icon image of the user, the user information management unit 304 searches the username 1901 included in user attributes of the user table (FIG. 13). As a result of the search according to the search request, if the user information management unit 304 determines that a username (user information) is registered (YES in step S409), the processing proceeds to step S410. If the user information management unit 304 determines that the username is not registered (NO in step S409), the processing proceeds to step S416.

If, in step S409, the user information management unit 304 determines that the user information is registered (YES in step S409), then in step S410, the login processing unit 306 obtains the username from the user information management unit 304 as the searched user information.

Then in step S411, the login processing unit 306 determines whether password information in the user information obtained in step S410 is registered in the password 1902 of the user table (FIG. 13). If the login processing unit 306 determines that the password information is registered (YES in step S411), the processing proceeds to step S412. If the login processing unit 306 determines that the password information is not registered (NO in step S411), the processing proceeds to step S415.

If, in step S411, the login processing unit 306 determines that password information is registered (YES in step S411), then in step S412, the login screen management unit 303 displays the password input screen 900 at the time of registering a password on the operation unit 208.

Then in step S413, the login processing unit 306 obtains password information input by the user on the password input screen 900 displayed by the login screen management unit 303 in step S412. The login processing unit 306 collates the password information with the password information obtained in step S410.

Then in step S414, if the login processing unit 306 determines that the password information collated in step S413 coincides with the password information obtained in step S410 (YES in step S414), the processing proceeds to step S415. If the password information collated is determined not to coincide with the password information obtained in step S410 (NO in step S414), the processing proceeds to step S416.

If, in step S414, the login processing unit 306 determines that the password information coincides with the password information obtained in step S410 (YES in step S414), then in step S415, the login screen management unit 303 hides the user authentication screen 800 displayed on the operation unit 208. The login screen management unit 303 switches display to the application selection menu screen 1500 or the operation screen 1600 of an application.

If, in step S409, the user information management unit 304 determines that the user information is not registered (NO in step S409), then in step S416, the login screen management unit 303 displays an authentication error screen indicating a user authentication error on the operation unit 208. The processing returns to step S402. If, in step S414, the login processing unit 306 determines that the password information does not coincide with the password information obtained in step S410 (NO in step S414), then in step S416, the login screen management unit 303 displays the authentication error screen indicating the user authentication error on the operation unit 208. The processing returns to step S402.

In this way, even in an environment including a large number of users, a user who has a card can use the MFP 10 by simply holding the card over the card reader 219 without the need to search for the user's own icon image. Some users having no card can also log in by simply selecting their own icon images on the touch panel without the need to input a username or a password.

Figure 17:
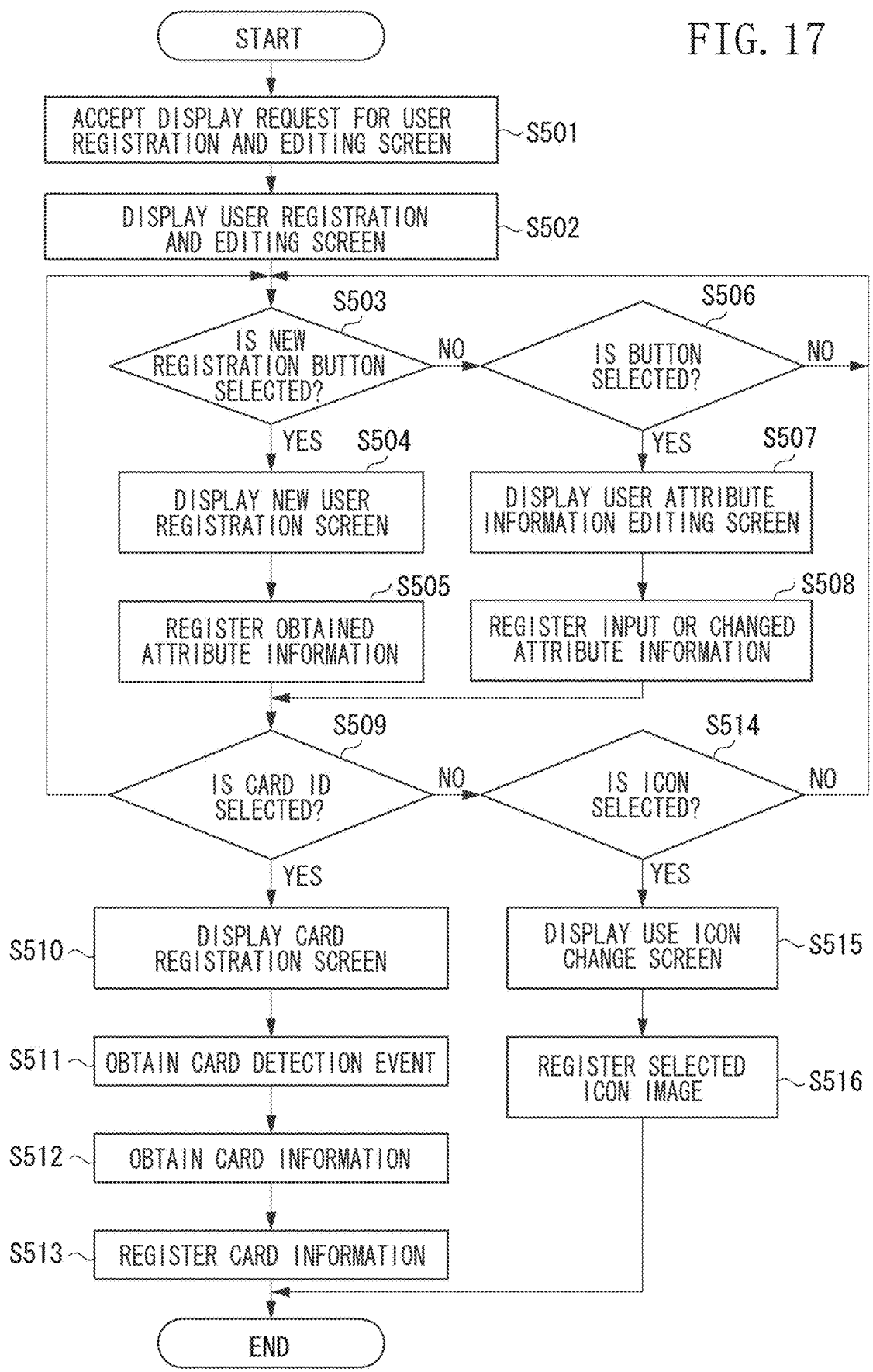
FIG. 17 is a flowchart illustrating a method for controlling the image forming apparatus.

FIG. 17 is a flowchart illustrating a method for controlling the image forming apparatus according to the present exemplary embodiment. This example corresponds to user registration processing during user authentication by the image forming apparatus. A program for performing the steps according to the present exemplary embodiment is stored as software in the ROM 203 or the HDD 204 of the MFP 101. The steps are executed by the CPU 201 of the MFP 101. In the following description, the modules illustrated in FIG. 3 are described to be entities.

In step S501, if the user selects the user registration/edit button 804 of the user authentication screen 800 (FIG. 6) intended for user authentication using icon selection and a card, the login screen management unit 303 accepts a display request for the user registration and editing screen 1000 illustrated in FIG. 8. In step S502, the login screen management unit 303 displays the user registration and editing screen 1000 on the operation unit 208.

In step S503, the login screen management unit 303 determines whether the new registration button 1004 of the user registration and editing screen 1000 is selected by the user. If the login screen management unit 303 determines that the new registration button 1004 is selected (YES in step S503), the processing proceeds to step S504. If the login screen management unit 303 determines that the new registration button 1004 is not selected (NO in step S503), the processing proceeds to step S506.

If, in step S503, the new registration button 1004 of the user registration and editing screen is determined to be selected (YES in step S503), then in step S504, the login screen management unit 303 displays the new user registration screen 1200 illustrated in FIG. 10 on the operation unit 208.

Then, in step S505, the login screen management unit 303 obtains attribute information input by the user to the new user registration screen 1200 displayed in step S504, and issues a user registration request to the user information management unit 304. The processing proceeds to step S509. Accepting the user registration request, the user information management unit 304 registers the obtained attribute information into the user table (FIG. 13).

If, in step S503, the new registration button 1004 is determined not to be selected (NO in step S503), then in step S506, the login screen management unit 303 determines whether any one of the buttons 1001 to 1003 corresponding to the icon images on the user registration and editing screen 1000 is selected. If the login screen management unit 303 determines that one of the buttons 1001 to 1003 corresponding to the icon images is selected (YES in step S506), the processing proceeds to step S507. If the login screen management unit 303 determines that none of the buttons 1001 to 1003 corresponding to the icon images are selected (NO in step S506), the processing returns to step S503.

If, in step S506, one of the buttons 1001 to 1003 corresponding to the icon images on the user registration and editing screen 1000 is determined to be selected (YES in step S506), then in step S507, the login screen management unit 303 obtains user information linked with the selected icon image from the user table (FIG. 13). The login screen management unit 303 displays the user attribute information editing screen 1100 illustrated in FIG. 9 on the operation unit 208.

Then, in step S508, the login screen management unit 303 obtains attribute information input or changed by the user on the user attribute information editing screen 1100 displayed in step S507. The login screen management unit 303 then requests the user information management unit 304 to register the input or changed attribute information into the user table (FIG. 13). The processing proceeds to step S509. Accepting the request, the user information management unit 304 registers the obtained attribute information into the user table (FIG. 13).

In step S509, the login screen management unit 303 determines whether either of the card ID 1203 on the new user registration screen 1200 displayed in step S504 and the card ID 1103 on the user attribute information editing screen 1100 is selected. If the login screen management unit 303 determines that the card ID 1203 or 1103 which indicates a card registration screen request is selected (YES in step S509), the processing proceeds to step S510. On the other hand, if the login screen management unit 303 determines that neither of the card IDs 1203 and 1103 is selected (NO in step S509), the processing proceeds to step S514.

If, in step S509, the card ID 1203 or 1103 is determined to be selected (YES in step S509), then in step S510, the login screen management unit 303 displays the card registration screen 1400. After displaying the card registration screen 1400, the login screen management unit 303 requests the card reader control unit 305 to start detection and acceptance of a card. The card reader control unit 305 accepts the request to start detection and acceptance of a card, and puts the card reader 219 into a state where the detection and acceptance of a card is started.

Then, in step S511, if the user holds an IC card over the card reader 219 with the card registration screen 1400 displayed in step S510, the login screen management unit 303 obtains a card detection event from the card reader control unit 305. If a card detection event is obtained in step S511, then in step S512, the login screen management unit 303 obtains the detected card information from the card reader control unit 305.

Then, in step S513, the login screen management unit 303 requests the user information management unit 304 to register the card information obtained in step S512. The card information is thereby registered into the card ID 1903 of the user table (FIG. 13) as a card attribute.

If, in step S509, neither of the card IDs 1203 and 1103 is determined to be selected (NO in step S509), then in step S514, the login screen management unit 303 determines whether either of the icons 1206 and 1106 is selected. If the login screen management unit 303 determines that the icon 1206 or 1106 which indicates an icon image selection screen request is selected (YES in step S514), the processing proceeds to step S515. On the other hand, if the login screen management unit 303 determines that neither of the icons 1206 and 1106 are selected (NO in step S514), the processing returns to step S503.

If, in step S514, the icon 1206 or 1106 which indicates an icon image selection screen request is determined to be selected (YES in step S514), then in step S515, the login screen management unit 303 displays the use icon image change screen 1300 on the operation unit 208.

Then, in step S516, the login screen management unit 303 requests the user information management unit 304 to register the icon image selected by the user in step S515 so that the icon image is linked with the selected user. Accepting the registration request, the user information management unit 304 registers the icon image into the icon 1907 corresponding to an icon attribute of the user table (FIG. 13).

Figure 18:
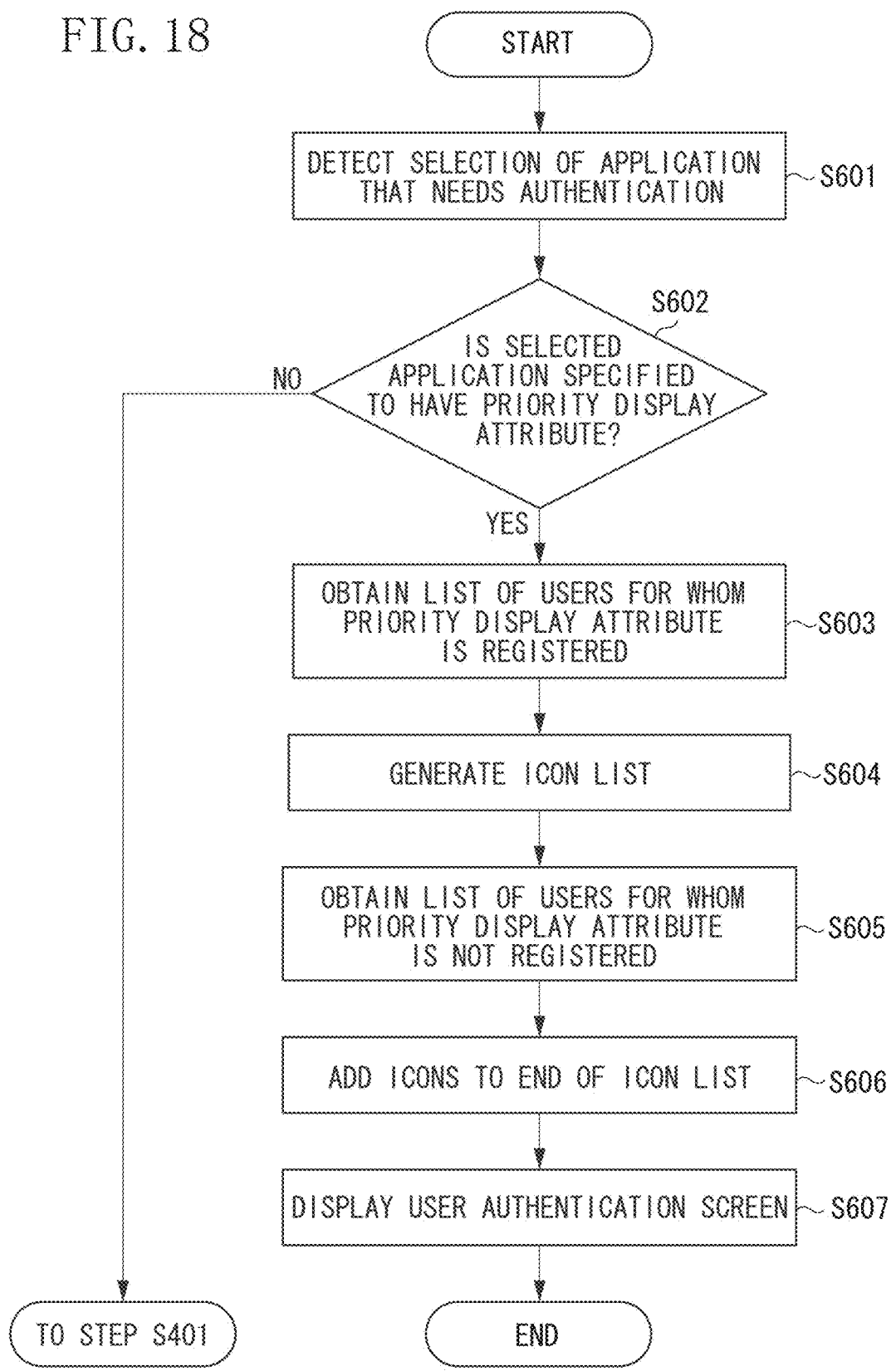
FIG. 18 is a flowchart illustrating a method for controlling the image forming apparatus.

FIG. 18 is a flowchart illustrating a method for controlling the image forming apparatus according to the present exemplary embodiment. This example corresponds to icon display processing during user authentication when selecting a function of the image forming apparatus. A program for performing the steps according to the present exemplary embodiment is stored as software in the ROM 203 or the HDD 204 of the MFP 101. The steps are executed by the CPU 201 of the MFP 101. In the following description, the modules illustrated in FIG. 3 are described to be entities.

In step S601, the login screen management unit 303 detects selection of an application that needs authentication on the application selection menu screen 1500. In step S602, the login screen management unit 303 obtains a specification attribute from a priority display attribute specification table illustrated in FIG. 19, and determines whether the application selected in step S601 is specified to have an icon priority display attribute. If the login screen management unit 303 determines that the selected application is specified to have an icon priority display attribute (YES in step S602), the processing proceeds to step S603. On the other hand, if the login screen management unit 303 determines that the selected application is not specified to have an icon priority display attribute (NO in step S602), the processing proceeds to step S401.

If, in step S602, the selected application is determined to be specified to have an icon priority display attribute (YES in step S602), then in step S603, the login screen management unit 303 obtains a list of users for whom the priority display attribute is registered from the user table (FIG. 13) via the user information management unit 304.

Then, in step S604, the login screen management unit 303 obtains icons 1907 registered as being linked with the users from the list of users obtained in step S603, and generates an icon list to display on the operation unit 208. In step S605, the login screen management unit 303 obtains a list of users for whom the priority display attribute is not registered from the user table (FIG. 13) via the user information management unit 304.

Then, in step S606, the login screen management unit 303 obtains icons 1907 registered as being linked with the users from the list of users obtained in step S605, and adds the icons 1907 to the end of the icon list generated in step S604. In step S607, the login screen management unit 303 generates the user authentication screen 800 intended for user authentication using icon selection and an IC card based on the icon list generated in step S606, and displays the user authentication screen 800 on the operation unit 208.

The priority display attribute mentioned above will be further described below with reference to FIG. 19. The present exemplary embodiment deals with an example of controlling a display mode of the operation screen displayed on the operation unit 208 depending on whether the user is determined to be accepted by using a card or by the selection of a user icon image. In the following description, display order of user icon images is controlled based on information about the users registered in the HDD 204.

FIG. 19 illustrates the priority display attribute specification table which manages the priority display attribute. In the priority display attribute specification table, a specification attribute 2002 is managed as being linked with an application 2001 provided by the MFP 101. In the present exemplary embodiment, no specification attribute 2002 is specified for the application "copy". In the case of the application "copy", icon images are therefore displayed on the operation unit 208 in order in which the icon images are obtained from the user table (FIG. 13).

The application "scan and transmit" is specified to have a mail address and/or a my folder as the specification attribute 2002. Users whose mail address and/or my folder are registered in the user table (FIG. 13) are highly likely to use the scan and transmission function. The icon images of such users are therefore displayed by priority.

Figure 20:
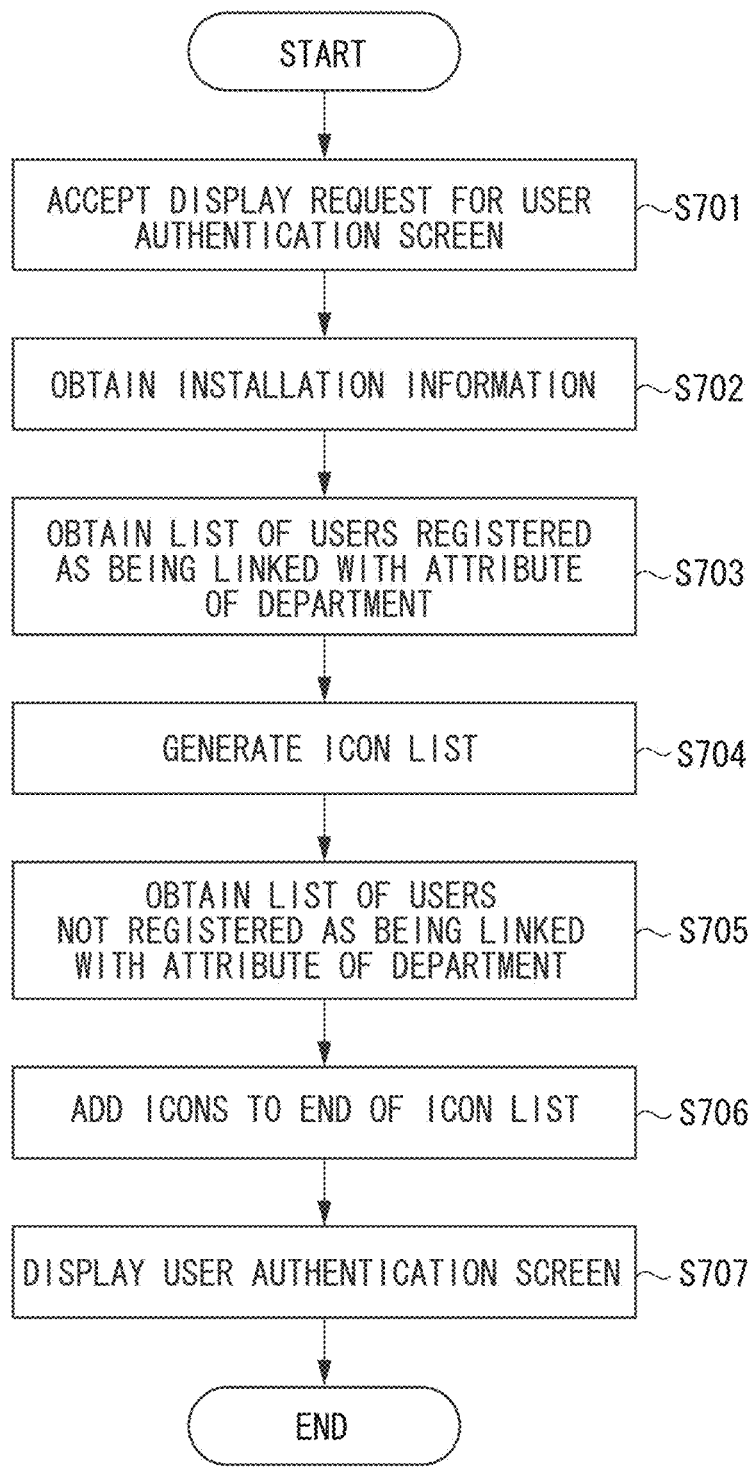
FIG. 20 is a flowchart illustrating a method for controlling the image forming apparatus.

FIG. 20 is a flowchart illustrating a method for controlling the image forming apparatus according to the present exemplary embodiment. This example corresponds to icon display processing according to a distance between the MFP 101 illustrated in FIG. 2 and the user. A program for performing the steps according to the present exemplary embodiment is stored as software in the ROM 203 or the HDD 204 of the MFP 101. The steps are executed by the CPU 201 of the MFP 101. In the following description, the modules illustrated in FIG. 3 are described to be entities.

In step S701, the login screen management unit 303 accepts a display request for the user authentication screen 800 intended for user authentication using icon selection and a card. In step S702, the login screen management unit 303 obtains information (installation information about installation of the image forming apparatus) for identifying an installation office room 2101 and a department 2102 of the installation office room 2101 from an installation location management table (illustrated in FIG. 21) of the MFP 101.

Then, in step S703, the login screen management unit 303 obtains a list of users registered as being linked with the attribute of the department 2102 obtained in step S702 from the user table (FIG. 13) via the user information management unit 304.

Then, in step S704, the login screen management unit 303 obtains icons 1907 registered as being linked with the users from the list of users obtained in step S703, and generates an icon list to display on the operation unit 208.

Then, in step S705, the login screen management unit 303 obtains a list of users not registered as being linked with the attribute of the department 2101 obtained in step S702 from the user table (FIG. 13) via the user information management unit 304.

Then, in step S706, the login screen management unit 303 obtains icons 1907 registered as being linked with the users from the list of users obtained in step S705, and adds the icons 1907 to the end of the icon list generated in step S704.

Then, in step S707, the login screen management unit 303 generates the user authentication screen 800 intended for user authentication using the selection of the buttons 801 to 803 corresponding to the icon images illustrated in FIG. 6 and an IC card based on the icon list generated in step S706, and displays the user authentication screen 800 on the operation unit 208. The processing ends.

The steps according to an exemplary embodiment of the present invention can also be implemented by a processing unit (CPU or processor) of a personal computer (computer) executing software (program) obtained via a network or various storage media.

The present invention is not limited to the foregoing exemplary embodiment. Various modifications (including organic combinations of the exemplary embodiments) may be made based on the gist of the present invention, and such modifications are not intended to be excluded from the scope of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A printing apparatus comprising:
a display configured to display information, and
one or more controllers configured to:
cause the display to display a login screen, on which a plurality of user objects corresponding to a plurality of users is arranged, for selecting a user object corresponding to a user to log in to the printing apparatus from among the plurality of user objects, wherein the user object contains a profile image; and cause the display to display a profile image edit screen for selecting a profile image from among a plurality of candidates profile images based on user operation for causing the display to display the profile imager edit screen, wherein the profile image being used in the login screen is displayed in the profile image edit screen in an identifiable manner.

2. The printing apparatus according to claim 1, wherein the controllers are further configured to cause the display to display a first screen related to one user of the plurality of users and including at least a profile name about a profile image used for a user object corresponding to the one user.

3. The printing apparatus according to claim 2, wherein the first screen includes information about a user name corresponding to the one user.

4. The printing apparatus according to claim 2, wherein the first screen includes information about a password corresponding to the one user.

5. The printing apparatus according to claim 2, wherein the first screen includes information about a card ID corresponding to the one user.

6. The printing apparatus according to claim 2, wherein the first screen includes information about a mail address corresponding to the one user.

7. The printing apparatus according to claim 2, wherein the first screen includes information about a folder corresponding to the one user.

8. The printing apparatus according to claim 2, wherein the first screen is a screen to which transition from a second screen is executable, and the second screen is a screen for selecting one user object to be edited from the plurality of user objects.

9. The printing apparatus according to claim 8, wherein the second screen includes an object to register.

10. The printing apparatus according to claim 1, wherein the printing apparatus includes at least one of a copy function, a scan function and a print function.

11. The printing apparatus according to claim 1, wherein a login process for one user of the plurality of users is performed based on selection of the user object corresponding to the one user.

12. The printing apparatus according to claim 1, wherein an operation screen customized for one user of the plurality of users is displayed on the display for selection of the user object corresponding to the one user.

13. The printing apparatus according to claim 1, wherein information about a web page for presenting the plurality of candidate profile images is output to an external apparatus.

14. The printing apparatus according to claim 13, wherein the web page includes information about a user name corresponding to one user of the plurality of users.

15. The printing apparatus according to claim 13, wherein the web page includes information about a password corresponding to one user of the plurality of users.

16. The printing apparatus according to claim 13, wherein the web page includes information about a card ID corresponding to one user of the plurality of users.

17. The printing apparatus according to claim 13, wherein the web page includes information about a mail address corresponding to one user of the plurality of users.

18. The printing apparatus according to claim 13, wherein the web page includes information about a folder corresponding to one user of the plurality of users.

19. The printing apparatus according to claim 1, wherein the selected profile image on the profile image edit screen is set as a profile image corresponding to one user object of the plurality of user objects in the login screen.

20. The printing apparatus according to claim 1, wherein the user object is a user button.

21. The printing apparatus according to claim 1, wherein the controllers are further configured to:
    based on a first user operation for causing the display to display the profile image edit screen, cause the display to display the profile image edit screen on which the profile image being used in the login screen is being displayed in an identifiable manner, and
    based on a second user operation for selecting the profile image, cause the display to display the profile image edit screen on which the profile image selected by the second user operation is being displayed in an identifiable manner.

22. The printing apparatus according to claim 1, wherein the profile image displayed on the profile image edit screen in the identifiable manner is the profile image being used for the user object corresponding to the user logging in to the printing apparatus.

23. A method for controlling a printing apparatus, the method comprising:
    causing a display to display a login screen for selecting a user object to be selected corresponding to a user to log in to the printing apparatus and on which a plurality of user objects corresponding to a plurality of users is arranged, wherein the user object contains a profile image; and
    causing the display to display a profile image edit screen for selecting a profile image from among a plurality of candidate profile images based on user operation for causing the display to display the profile image edit screen, wherein a profile image being used in the login screen is displayed in an identifiable manner on the profile image edit screen displayed based on the user operation.

* * * * *